US012417676B2

(12) United States Patent
Riley et al.

(10) Patent No.: US 12,417,676 B2
(45) Date of Patent: Sep. 16, 2025

(54) LOTTERY TICKET SELLING SYSTEMS AND METHODS

(71) Applicant: Brightstar Global Solutions Corporation, Providence, RI (US)

(72) Inventors: Paul Riley, East Greenwich, RI (US); Robert Corvese, Warwick, RI (US); Pawel Smolenski, Książenice (PL); Michal Taborowski, Blizne Jaskinkiego (PL)

(73) Assignee: Brightstar Global Solutions Corporation, Providence, RI (US)

( * ) Notice: Subject to any disclaimer, the term of this patent is extended or adjusted under 35 U.S.C. 154(b) by 246 days.

(21) Appl. No.: 18/321,953

(22) Filed: May 23, 2023

(65) Prior Publication Data

US 2024/0395113 A1 Nov. 28, 2024

(51) Int. Cl.
*G07F 17/32* (2006.01)

(52) U.S. Cl.
CPC ........ *G07F 17/329* (2013.01); *G07F 17/3225* (2013.01)

(58) Field of Classification Search
USPC .......... 463/17
See application file for complete search history.

(56) References Cited

U.S. PATENT DOCUMENTS

| | | | |
|---|---|---|---|
| 5,818,026 A | 10/1998 | Melling et al. | |
| 6,663,105 B1 | 12/2003 | Sullivan et al. | |
| 10,783,744 B2 | 9/2020 | Asher et al. | |
| 11,837,048 B2 * | 12/2023 | Lutnick | G07F 17/3241 |
| 2007/0117609 A1 | 5/2007 | White et al. | |
| 2010/0222125 A1 | 9/2010 | Nyman et al. | |
| 2011/0275432 A1 * | 11/2011 | Lutnick | G07F 17/3244 463/25 |
| 2016/0203675 A1 * | 7/2016 | Lutnick | G07F 17/3244 463/16 |
| 2019/0188959 A1 * | 6/2019 | Lutnick | G07F 17/3232 |
| 2019/0259239 A1 | 8/2019 | Barnes | |
| 2021/0295648 A1 * | 9/2021 | Lutnick | G07F 17/3225 |
| 2022/0058912 A1 | 2/2022 | Gotlieb et al. | |
| 2022/0148371 A1 | 5/2022 | Gotlieb et al. | |

OTHER PUBLICATIONS

"theLotter—How Our Service Works: Playing It Global with theLotter", located at: https://www.thelotter.com > how-it-works; available before the priority date of this patent application, May 23, 2023.

(Continued)

*Primary Examiner* — Pierre E Elisca

(74) *Attorney, Agent, or Firm* — Neal, Gerber & Eisenberg LLP

(57) ABSTRACT

A lottery ticket selling system and methods of operating the system that enable the purchase of a lottery ticket by a player using an electronically created play slip. In various embodiments, the lottery ticket selling system and methods of operating the lottery ticket selling system, wherein the lottery ticket selling system includes a player electronic device, a courier server, a CIS reader emulator, a lottery terminal (including a CIS reader), and a lottery ticket printer.

20 Claims, 5 Drawing Sheets

(56) References Cited

OTHER PUBLICATIONS

"theLotter's Online Lottery Courier Services", located at: https://www.thelotter.com/lottery-courier/; available before the priority date of this patent application, May 23, 2023.
"What are Lottery Courier Services?", Location Smart, located at: https://www.locationsmart.com/company/news/what-are-lottery-courier-services; available before the priority date of this patent application, May 23, 2023.

* cited by examiner

LOTTERY TICKET SELLING SYSTEMS AND METHODS

BACKGROUND

The present disclosure relates to lottery ticket selling systems and methods that enable the purchase of lottery tickets via electronically created play slips and lottery terminals.

For a draw lottery ticket for a draw lottery game, a player may select the player numbers or may have an electronic lottery system randomly select the player numbers (which is often referred to as a quick pick). Draw lottery tickets may be purchased in variety of different manners using a variety of different systems such as systems that include lottery terminals. Various different jurisdictions (such as states) have different rules regarding how such draw lottery tickets can be purchased.

BRIEF SUMMARY

In various embodiments, the present disclosure relates to a lottery ticket selling system including a courier server configured to receive lottery ticket purchase data from a player electronic device, the lottery ticket purchase data including indications of player numbers for a lottery ticket for a play of a draw lottery game, create digital play slip image data in a first format and including indications of the player numbers for the lottery ticket for the play of the draw lottery game, and transmit the digital play slip image data. The lottery ticket selling system also includes a play slip reader emulator configured to receive the digital play slip image data from the courier server, create play slip scan data using the digital play slip image data, wherein the play slip scan data is in a second format configured to be received by a lottery terminal, and wherein the play slip scan data includes indications of the player numbers for the lottery ticket for the play of the draw lottery game, and transmit the play slip scan data to a lottery terminal.

In various other embodiments, the present disclosure relates to a lottery ticket selling system play slip reader emulator including a play slip web server configured to receive the digital play slip image data in a first format from a courier server. The courier server is configured to receive lottery ticket purchase data from a player electronic device, wherein the lottery ticket purchase data includes indications of player numbers for a lottery ticket for a play of a draw lottery game, create the digital play slip image data in a first format and including indications of the player numbers for the lottery ticket for the play of the draw lottery game, and transmit the digital play slip image data to the play slip web server. The lottery ticket selling system further includes a play slip que configured to hold the digital play slip image data, a reader emulator configured to create play slip scan data using the digital play slip image data, wherein the play slip scan data is in a second format configured to be received by a lottery terminal, and wherein the play slip scan data includes indications of the player numbers for the lottery ticket for the play of the draw lottery game, and a transmitter configured to transmit the play slip scan data to a lottery terminal.

In various other embodiments, the present disclosure relates to a lottery ticket selling system play slip reader emulator including a play slip web server configured to receive the digital play slip image data in a first format from a courier server. The courier server is configured to: receive lottery ticket purchase data from a player electronic device, the lottery ticket purchase data including indications of player numbers for a lottery ticket for a play of a draw lottery game, create the digital play slip image data in a first format and including indications of the player numbers for the lottery ticket for the play of the draw lottery game, and transmit the digital play slip image data to the play slip web server. The lottery ticket selling system play slip reader emulator further includes: a play slip que configured to hold the digital play slip image data; a reader emulator configured to create play slip scan data using the digital play slip image data, wherein the play slip scan data is in a second format configured to be received by a play slip reader driver device of a lottery terminal, and wherein the play slip scan data includes indications of the player numbers for the lottery ticket for the play of the draw lottery game; and a transmitter configured to transmit the play slip scan data to the play slip reader driver device of the lottery terminal, wherein the lottery terminal includes play slip reader hardware configured to transmit the play slip scan data in a third format to the lottery terminal, and wherein the second format is the same as the third format, and wherein the second format is different than the first format.

Additional features are described in, and will be apparent from, the following Detailed Description and the figures.

DETAILED DESCRIPTION

In various embodiments, the present disclosure relates generally to a lottery ticket selling system and methods of operating the lottery ticket selling system, wherein the lottery ticket selling system includes: (a) a player electronic device, (b) a courier server, (c) a CIS reader emulator, (d) a lottery terminal (including a CIS reader), and (e) a lottery ticket printer. In various embodiments, the lottery ticket selling system enables the purchase of a lottery ticket by a player via an electronically created play slip.

Draw lottery tickets for draw lottery games are employed as example lottery tickets herein; however, it should be appreciated that the present disclosure is not meant to be limited by such examples. For a better understanding of the present disclosure, an example draw lottery ticket is first described herein.

A draw lottery ticket can include: (1) a single set of player numbers for a single play of a draw lottery game; (2) multiple sets of player numbers for a single play of a draw lottery game; (3) a single set of player numbers for each of multiple plays of a draw lottery game; or (4) multiple sets of player numbers for each of multiple plays of a draw lottery game. For simplicity, the present disclosure uses a draw lottery ticket with a single set of player numbers for a single play of a draw lottery game as an example, but it should be appreciated that the present disclosure can be employed for purchasing and redeeming such various other draw lottery tickets.

Figure 1:
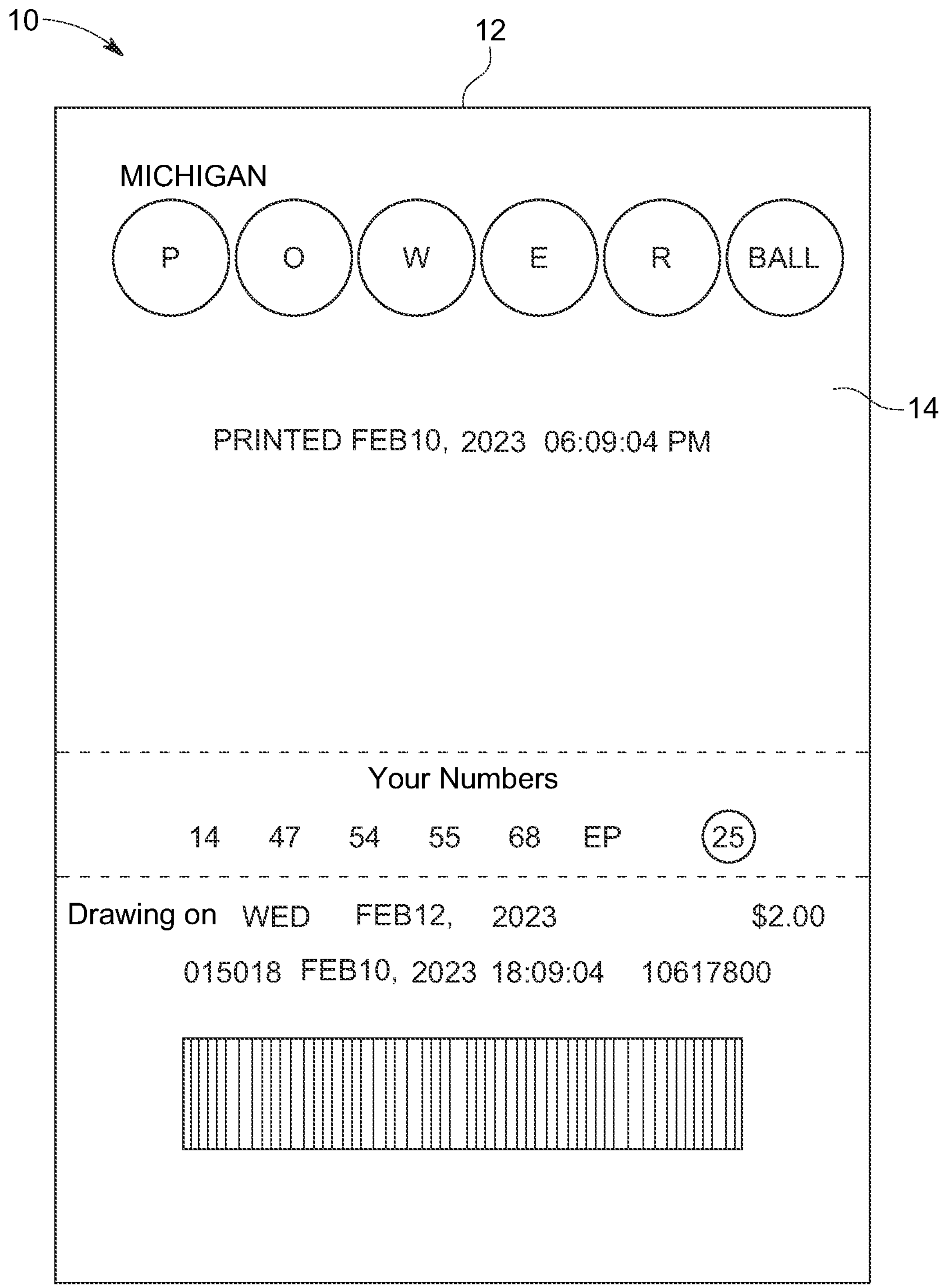
FIG. 1 is front view of an example draw lottery ticket.

Draw lottery tickets can either be physical or virtual. An example physical draw lottery ticket 10 is shown in FIG. 1. This example draw includes: (1) a ticket substrate 12; (2) a front surface 14 of the ticket substrate 12; (3) a single set of player numbers (for a single play of draw lottery game) printed on the front surface 14 of the ticket substrate 12; (4) a back surface (not shown) of the ticket substrate 12; and (5) lottery game and ticket information (not labeled) printed on the front surface 14 of the ticket substrate 12. This example draw lottery ticket 10 is for a single play of a draw lottery game (scheduled to take place on Wednesday Feb. 12, 2023) and includes a single set of player numbers (i.e., player numbers for the single play of the draw lottery game). It should be appreciated that while this draw lottery ticket is for a single play, draw lottery tickets often include multiple sets of player numbers that are for a single play of the draw lottery game. The lottery ticket information can include text, one or more ticket numbers, one or more ticket barcodes, and other instant lottery ticket information that is in either or both human readable and machine readable forms. The lottery ticket's barcode is configured to be scanned by a barcode reading device to enable redemption of such draw lottery ticket.

Additionally, for a better understanding of the present disclosure, various known systems and methods employed for purchasing draw lottery tickets are also now described.

In a first example known system and method for purchasing a draw lottery ticket for a draw lottery game in person, a player selects the player numbers for the draw lottery ticket and the player fills out a paper play slip with the player's selected numbers. The player hands that play slip to an operator of a lottery terminal and the operator causes the operator uses a lottery terminal including a CIS reader to scan the paper play slip. The CIS reader of the lottery terminal creates play slip scan data for the play of the draw lottery game. The CIS reader provides the play slip scan data to the terminal application of the lottery terminal. The terminal application of the lottery terminal interprets and uses that play slip scan data to create a draw lottery ticket including the player numbers. The lottery terminal and specifically the terminal application causes a lottery ticket printer to print out the draw lottery ticket with the player numbers. The lottery ticket printer can be part of the lottery terminal or separate from but connected to the lottery terminal. The operator of the lottery terminal also collects the payment for the draw lottery ticket and provides the printed draw lottery ticket to the player. It should be appreciated that in certain such systems, the lottery terminal includes the CIS reader and the lottery ticket printer in one cabinet. In other systems, the CIS reader and/or the lottery ticket printer can be separate from the lottery terminal cabinet and connected to the lottery terminal by suitable wires.

In a slight variation of this first example known system and method for purchasing a draw lottery ticket for a draw lottery game in person, a player does not select the player numbers for the draw lottery ticket and the player marks a paper play slip with an indication of a requested quick pick for the player numbers. The player hands that play slip to an operator of a lottery terminal and the operator uses a lottery terminal including a CIS reader to scan the paper play slip. The CIS reader of the lottery terminal creates play slip scan data for the play of the draw lottery game. The CIS reader provides the play slip scan data to the terminal application of the lottery terminal. The terminal application of the lottery terminal interprets and uses that play slip scan data to create a draw lottery ticket including the player numbers. In this case, the lottery terminal randomly generates the player numbers. The lottery terminal and specifically the terminal application causes a lottery ticket printer to print out the draw lottery ticket with the player numbers. The lottery ticket printer can be part of the lottery terminal or separate from but connected to the lottery terminal. The operator of the lottery terminal also collects the payment for the draw lottery ticket and provides the printed draw lottery ticket to the player.

In a second example known system and method for purchasing a draw lottery ticket for a draw lottery game in person, a player does not fill out a paper play slip with the player's selected numbers, but rather the player tells the operator of a lottery terminal that the player wants to purchase a draw lottery ticket using a quick pick for a draw lottery game and the operator inputs that request into the lottery terminal (via an operator interface of the lottery terminal). The lottery terminal randomly determines the player numbers for the player's lottery ticket for the play of the lottery game and uses those numbers to create a draw lottery ticket. The lottery terminal then causes a lottery ticket printer to print out the draw lottery ticket with the player numbers. The lottery ticket printer can be part of the lottery terminal or separate from but connected to the lottery terminal. The operator of the lottery terminal also collects the payment for the draw lottery ticket and provides the printed draw lottery ticket to the player.

In a third example known system and method for purchasing a draw lottery ticket for a draw lottery game in person, a player uses a suitable application on a player's computer such as a player mobile electronic device (such as mobile telephone) to fill out an electronic play slip displayed by player computer with the player's selected numbers for the draw lottery game or a quick pick. The application creates a barcode displayable by the display device of the player mobile electronic device. The player causes their mobile electronic device to display the barcode such that a CIS reader of a lottery terminal having a barcode scanner scans the barcode and creates the lottery ticket scan data representing the player numbers or the quick pick for the play of the draw lottery game. The CIS reader sends the lottery ticket scan data to a terminal application of the lottery terminal, and the terminal application uses that lottery ticket scan data to create a draw lottery ticket including the player numbers (respectively either selected by the player or randomly selected by the lottery terminal). The lottery terminal causes a lottery ticket printer to print out the draw lottery ticket with the player numbers. The operator of the lottery terminal also collects the payment for the draw lottery ticket and provides the printed draw lottery ticket to the player.

In a fourth example known system and method for purchasing a draw lottery ticket for a draw lottery game remotely (from any lottery terminal), a player uses their computer such as a player mobile electronic device (such as mobile telephone) to access a web site to fill out an electronic play slip with the player numbers (selected by the player or randomly selected by the web site) for the draw lottery game. The web site functions with a lottery host system to create a draw lottery ticket including the player numbers. The web site also functions with a lottery host system to obtain payment for the draw lottery ticket including the player numbers. The lottery host system creates the virtual draw lottery ticket with the player numbers for the player and sends that virtual draw lottery ticket to an email address of the player. This fourth example known system does not include any lottery terminal (or CIS reader thereof).

This fourth example known system is only legal in a limited quantity of states in the United States that permit the purchase of draw lottery tickets via such completely remote and electronic systems and methods.

In various other states that do not permit such completely remote and electronic purchase of draw lottery tickets (such as via the above described fourth example known system and method), a fifth example known system using a courier service has been employed. This fifth example known system and method has been used to enable players to remotely electronically purchase draw lottery tickets for draw lottery games wherein the courier service conducts various physical steps of the lottery ticket purchase process on behalf of the players. More specifically, in this fifth example known system and method for purchasing a draw lottery ticket for a draw lottery game remotely from any lottery terminal, a player uses a suitable application on their mobile electronic device (such as mobile telephone) to purchase a draw lottery ticket (which can include the player inputting the player's selected numbers or a quick pick indication for the draw lottery game). This application is often referred to as a courier mobile application. The courier mobile application functions to create lottery ticket purchase data (including the player's selected numbers or the quick pick numbers that the courier mobile application randomly selected) and causes the player's mobile electronic device to send the lottery ticket purchase data via a data network to a courier server at a courier processing center. The courier server uses the received lottery ticket purchase data to create and cause a courier printer to physically print a physical paper play slip for the play of the draw lottery game at the courier processing center. The play slip includes the player numbers. A human courier processing clerk takes the physical printed paper play slip for the play of the draw lottery game to an operator of a lottery terminal at a physical location of the lottery terminal that is remote from the courier processing center. The operator uses the lottery terminal (which includes a CIS reader) to scan the physical printed paper play slip. The CIS reader creates play slip scan data for the draw lottery ticket, and the terminal application of the lottery terminal uses that play slip scan data to determine the player numbers for the play of the draw lottery game and to create the lottery ticket (such as in the same manner as described above for the first example). The lottery terminal causes a lottery ticket printer to print out the draw lottery ticket with the player numbers. The operator of the lottery terminal also collects the payment for the draw lottery ticket from the courier processing clerk and provides the printed draw lottery ticket to the courier processing clerk. The courier processing clerk then takes the physical printed play slip and the physical printed draw lottery ticket back to the courier processing center. The courier processing clerk scans the physical printed lottery ticket using a courier scanning system connected the courier server. The courier server links the scanned draw lottery ticket back to the player account established through the courier mobile application. The courier server then makes the scanned lottery ticket available for the player to view via the courier mobile application on the player's mobile electronic device. The courier processing clerk places the physical printed play slip and the physical printed lottery ticket in secure courier storage locations for storage if needed at a later time. After the draw for the play of the draw lottery game takes place, if the player's lottery ticket is a winning lottery ticket and the winning amount is less than $600, the courier server automatically credits the winning amount for the player's draw lottery ticket to the player's account. The courier service can then retrieve and redeem the stored actual winning physical printed lottery ticket at a location having a lottery terminal. After the draw for the draw lottery game takes place, if the player's lottery ticket is a winning lottery ticket and the winning amount is $600 or more, a courier processing clerk retrieves the stored winning physical player lottery ticket from the courier storage location and sends that physical printed player lottery ticket to the player so that the player can cash in that lottery ticket and obtain the winning amount.

While this fifth example known system is permitted by various state lotteries, this fifth example known system has many disadvantages including but not limited to the following disadvantages. The courier service processes are time consuming, labor intensive, and due to the multiple steps can be more prone to errors (such as human errors and printing errors). The courier service processes require printers to physically print out the play slips, repeatedly handle the physically printed play slips, and to store the physically printed play slips-all of which waste physical supplies and energy. When the top award for a draw lottery game reaches a relatively large amount, there is often an increase in play of that draw lottery game, and such courier services often have a difficult time keeping up with the demand especially due to the need to physically print out the play slips. This is also partly due to the likelihood of longer player lines at locations with such lottery terminals that the courier processing clerks use submitting the physical printed play slips to purchase such player draw lottery tickets.

The present disclosure provides a lottery ticket selling system and method that improves upon the above described courier service processes and overcomes numerous of these disadvantages while still providing many of the advantages of the courier service processes, and while expected to be permitted by the various state lotteries that permit such courier services.

Various embodiments of the present disclosure employ an example play slip reader emulator to improve upon these processes as described below. A CIS reader emulator is used as an example herein, however, it should be appreciated that the present disclosure contemplates that other play slip reader emulators besides CIS reader emulators can be employed in accordance with the present disclosure.

Figure 2:
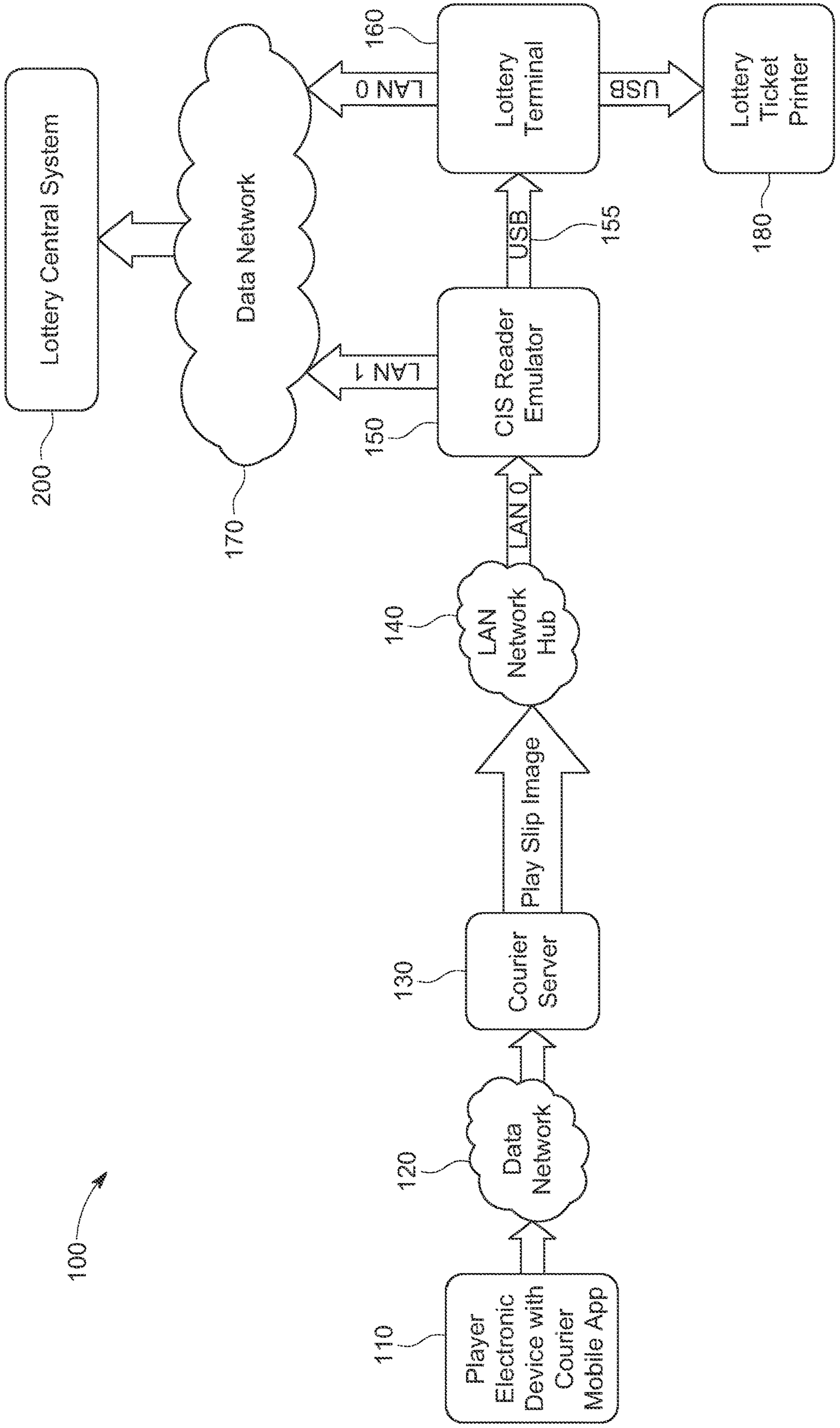
FIG. 2 is a diagrammatic view of a lottery ticket selling system including a player electronic device, a courier server, a CIS reader emulator, a lottery terminal, and a lottery ticket printer in accordance with one example embodiment of the present disclosure.
Figure 3:
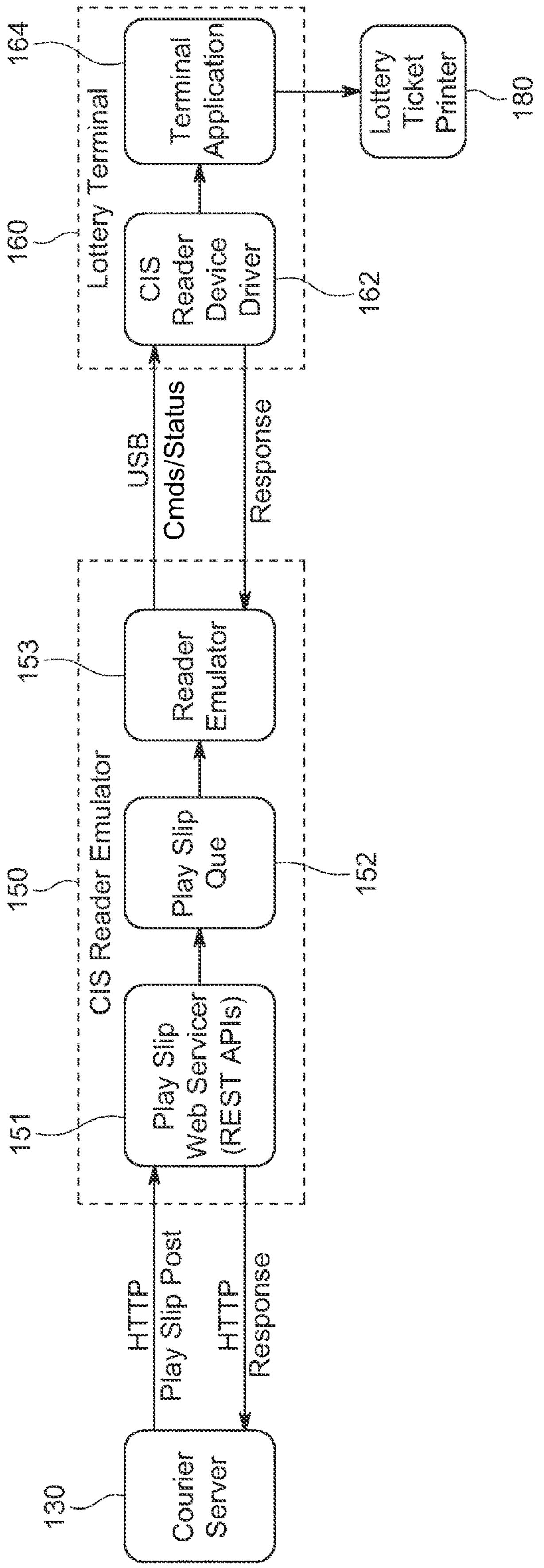
FIG. 3 is a diagrammatic view of part of the lottery ticket selling system of FIG. 2, including the courier server, the CIS reader emulator, a lottery terminal, and a lottery ticket printer.
Figure 4:
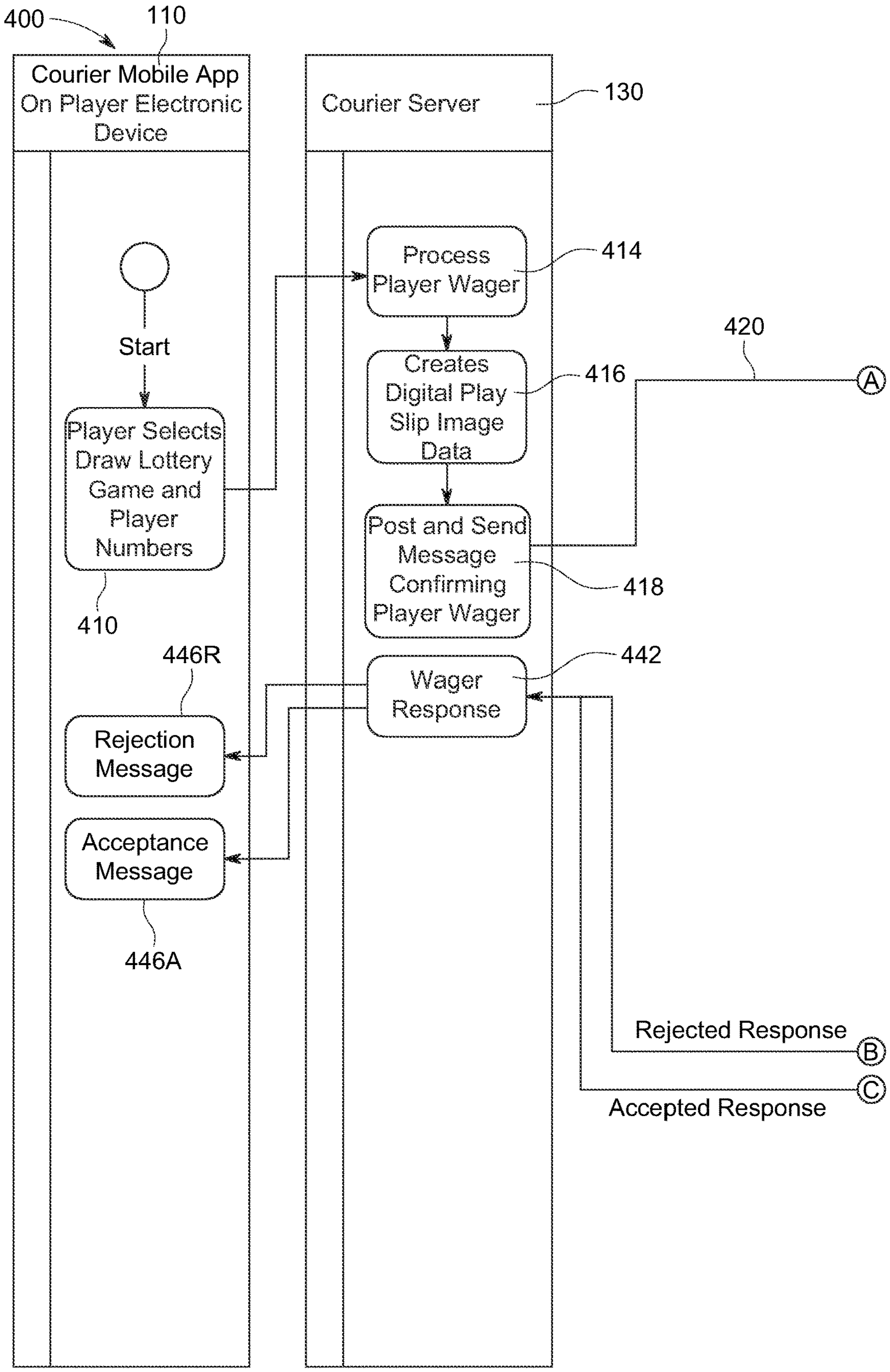
FIG. 4 is a flow diagram showing one example method of operation of the lottery ticket selling system of FIG. 2 in accordance with one example embodiment of the present disclosure.
Figure 4:
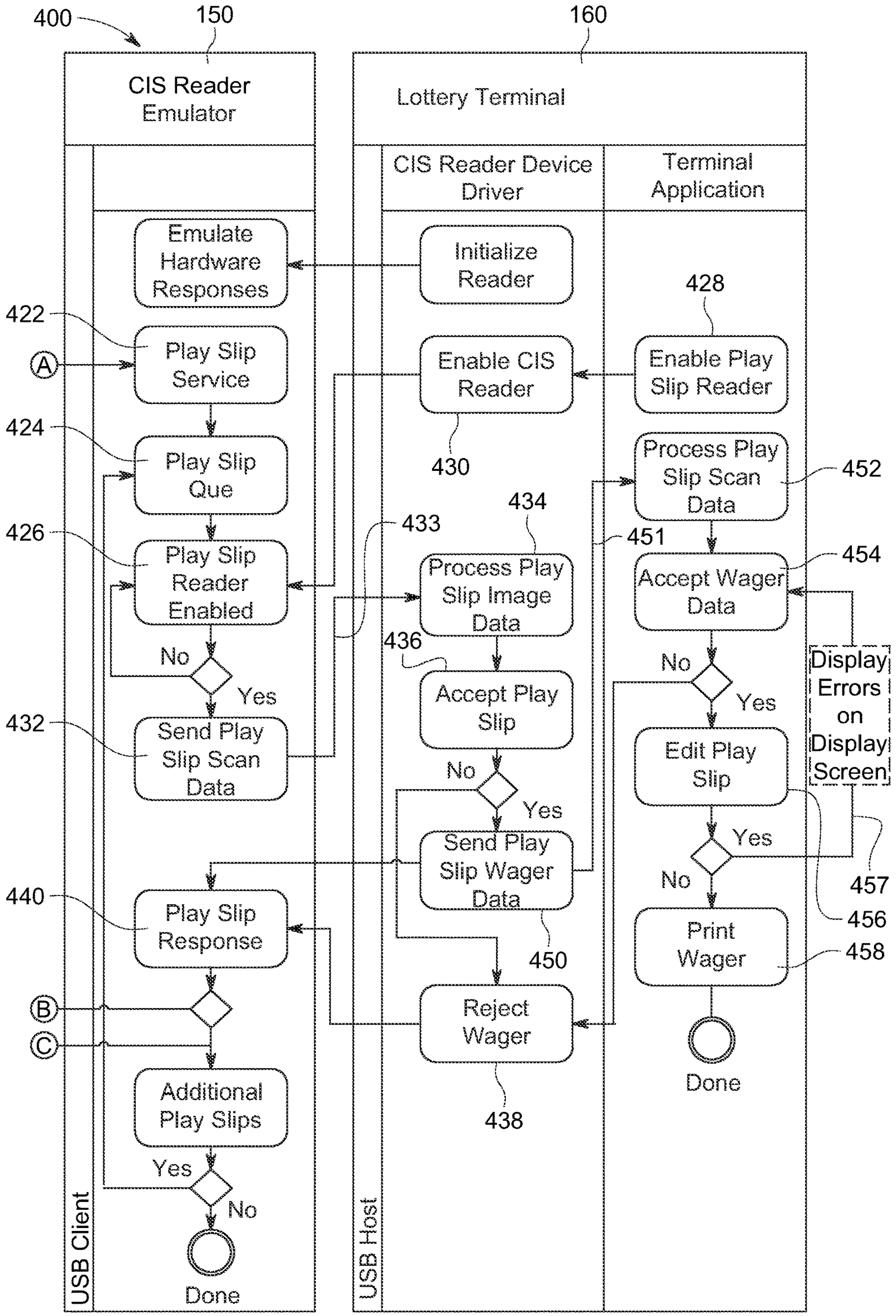

FIGS. 2 and 3 illustrate an example lottery ticket selling system of one example embodiment of the present disclosure and FIG. 4 illustrates an example method 400 of operating the example lottery ticket selling system 100 in accordance with one example embodiment of the present disclosure.

More specifically, this illustrated example embodiment of the present disclosure provides a lottery ticket selling system 100 including: (a) a player electronic device 110 with a courier mobile application downloaded thereon; (b) a courier server 130; (c) a CIS reader emulator 150; (d) a lottery terminal 160 (including a CIS reader); (e) a lottery ticket printer 180; and (f) a lottery central system 200. Various embodiments of the present disclosure are directed to methods of operating the lottery ticket selling system 100. Various other embodiments of the present disclosure are directed to the courier server itself and methods of operation thereof (such as the courier server 130 and methods of operation thereof described herein). Various other embodiments of the present disclosure are directed to the CIS reader emulator itself and methods of operation thereof (such as the CIS reader emulator 150 and methods of operation thereof described herein). Various other embodiments of the present disclosure are directed to the lottery terminal 160 itself and methods of operation thereof (such as the lottery terminal 160 and method of operation thereof described herein). Various other embodiments of the present disclosure are directed to the courier server and CIS reader emulator and methods of operation thereof. Various embodiments of the present disclosure are directed to the CIS reader emulator and the lottery terminal 160 and methods of operation thereof. Various other embodiments of the present disclosure are directed to the courier server, the CIS reader emulator, and the lottery terminal and methods of operation thereof.

In this illustrated example embodiment, the player electronic device 110 and the courier server 130 are configured to communicate with each other via a suitable data network 120 such as but not limited to a cellular data network or the internet.

In this illustrated example embodiment, the courier server 130 and the CIS reader emulator 150 are configured to communicate with each other via a suitable data network 120 such as but not limited to a local area network (i.e., a LAN). In other embodiments, the communication between these components can be via hard wire.

In this illustrated example embodiment, the CIS reader emulator 150 and the lottery terminal 160 are configured to communicate with each other via a hard wire such as via a USB connector. In other embodiments, the communication between these components can be via a suitable data network. In various embodiments, the CIS reader emulator 150 communicates with the CIS reader device driver 162 of the lottery terminal 160 as best shown in FIG. 3. In various other embodiments, the CIS reader emulator 150 bypasses the CIS reader hardware of the lottery terminal 160 and directly communicates with the terminal application 164 of the lottery terminal 160. In certain embodiments, the CIS reader hardware of the lottery terminal 160 can be disconnected.

In this illustrated example embodiment, the lottery terminal 160 and the lottery ticket printer 180 are configured to communicate with each other via hard wire such as an USB connector. In other embodiments, the communication between these components can be via a suitable data network. In other embodiments, the lottery ticket printer can be built into the same housing as the lottery terminal and thus physically connected by hard wires.

In this illustrated example embodiment, the lottery terminal 160 and the lottery central system 200 are configured to communicate with each other via a suitable data network 120 such as a cellular data network, the internet, or a private secure network.

More specifically, the player electronic device 110 with the courier mobile application downloaded thereon can be any suitable device such as an electronic smartphone, an electronic tablet, an electronic watch, or other suitable electronic computing device with suitable data communication, user input, and display functions. The courier mobile application downloaded on the player electronic device 110 can be the exact same commercially available courier mobile application as described above in connection with the fifth example or can be any other suitable courier mobile application. The courier mobile application is configured to enable a player to use the courier mobile application on the player electronic device 110 to set up a player account with the courier service, to deposit funds to the player account, to withdraw funds from the player account, and to use funds in the player account to purchase a lottery ticket for a draw lottery game via the courier mobile application (which can include the player inputting the player's selected numbers or a quick pick request for the draw lottery ticket for the draw lottery game that the player wishes to purchase and thus play). The courier mobile application functions on the player electronic device 110 to create lottery ticket purchase data (including the player selected numbers or the quick pick numbers) and cause the player electronic device 110 to send the lottery ticket purchase data via the data network 120 to the courier server 130 that is located at a suitable courier processing center (not shown).

The courier server 130 is a suitable server configured to perform at least the various functions described herein. More specifically, the courier server 130 is configured to receive lottery ticket purchase data from the player electronic device 110 via the courier mobile application and to create digital play slip image data (such as in the form of a bit map) for the draw lottery game based on the player's selected numbers or the quick pick numbers for the selected play of the selected draw lottery game. The courier server 130 is configured to send that digital play slip image data for the draw lottery game to the CIS reader emulator 150 via the LAN 140.

In various embodiments of the present disclosure, the courier server 130 is modified from the known courier server (described above). Specifically, the courier server 130 is modified to be configured to transmit the digital play slip image data to the CIS reader emulator 150 instead of to a play slip printer (or play slip printer que). The courier server 130 is also modified to be configured to receive confirmation from the CIS reader emulator 150 that such digital play slip image data has been received by the CIS reader emulator 150. In various embodiments, the digital play slip image data is the same exact play slip image data that the known courier server now creates and sends to the play slip printer. In various other embodiments, this digital play slip image data can be suitably modified. Thus, various embodiments of the present disclosure contemplate minimal changes to the known courier server to form the courier server 130.

The CIS reader emulator 150 can be any suitable device that is capable of receiving the digital play slip image data from the courier server 130 and processing the digital play slip image data for the selected play of the selected draw lottery game from the courier server 130 to create play slip scan data in a format that is acceptable for processing by the terminal application 164 of the lottery terminal 160. In various embodiments, this play slip scan data is in an identical (or substantially identical) format as the CIS reader device driver 162 of the lottery terminal 160 provides the terminal application 164 of the lottery terminal 160 as discussed above. Thus, various embodiments of the present disclosure contemplate minimal changes to the known lottery terminal to form the courier server 160.

In various embodiments, the CIS reader emulator 150 can include a video control unit that is generally configured to use the digital play slip image data received from the courier server 130 for the selected play of the selected draw lottery game to create the play slip scan data in the format that is acceptable for processing by the terminal application 164 of the lottery terminal 160. In various embodiments, as shown in FIG. 3, the CIS reader emulator 150 includes: (1) a play slip web server 151 configured to receive the digital play slip image data received from the courier server 130 (2) a play slip que 152 configured to hold the received digital play slip image data until receiving a signal to release the received digital play slip image data; and (3) a reader emulator 153 configured to convert the digital play slip image data into play slip scan data. Alternatively, the CIS reader emulator 150 and particularly the reader does not convert the digital play slip image data into play slip scan data, but rather sends the digital play slip image data (in a bit map format) to the CIS Reader Driver Device to and that device converts the digital play slip image data into play slip scan data. The conversion of the digital play slip image data for a lottery ticket into the play slip scan data for a lottery ticket is based on the format that the terminal application 164 of the lottery terminal 160 is configured to receive the play slip scan data from the CIS reader device driver 162 of the lottery terminal 160. In other words, the CIS reader emulator 150 and specifically the reader emulator 153 thereof interprets the received digital play slip image data for the lottery ticket and converts that data into play slip scan data for the lottery ticket such that the play slip scan data is in the same format that the CIS reader device driver 162 of the lottery terminal 160 is configured to provide play slip scan data (based on a scan of a physical play slip) to the terminal application 164 of the lottery terminal 160. Thus, the CIS reader emulator 150 emulates or enables the creation of the play slip scan data for processing by the terminal application 164 of the lottery terminal 160 without the need for the physical play slip to be printed or scanned. It should be appreciated that in a sense, the CIS reader emulator 150 thus looks the same to the terminal application 164 of the lottery terminal 160 as the CIS reader device driver 162 of the lottery terminal 160. It should be appreciated that the CIS reader emulator 150 can be otherwise configured in accordance with the present disclosure.

The lottery terminal 160 can be any suitable lottery terminal. The lottery terminal 160 is configured to receive the play slip scan data from the CIS reader emulator 150 in the same format that the lottery application 164 of the lottery terminal 160 is configured to receive play slip scan data from the CIS reader device driver 162 of the lottery terminal 160 (created by the CIS reader driver 162 based on a scan of a paper play slip). The lottery terminal application 164 is configured to create lottery ticket purchase request data based on the play slip scan data. The lottery ticket purchase request data can include an indication of the draw lottery game, the date of the play of the draw lottery game that the request relates to, and the player numbers or quick pick indication for the play of the draw lottery game.

For this illustrated example embodiment, the configuration, and functions of the lottery terminal 160 does not need to change or substantially change from the conventional configuration and functions of a lottery terminal. In various embodiments, the lottery terminal 160 and specifically the terminal application 164 of the lottery terminal 160 is configured to receive the play slip scan data from the CIS reader emulator 150 in addition to receiving play slip data from the CIS reader device driver 162. In such embodiments, the CIS reader hardware can be dormant at certain periods when the CIS reader emulator 150 is sending such play slip scan data. In various other embodiments, the lottery terminal 160 and specifically the CIS reader driver device 162 of the lottery terminal 160 is configured to receive the play slip scan data from the CIS reader emulator 150 and to transmit this play slip scan data to the terminal application 164 of the lottery terminal 160. It should be appreciated that in certain embodiments, only the physical scanning hardware of the CIS reader is dormant or bypassed and all other components of the CIS reader are active or employed.

The lottery ticket printer 180 can be any suitable lottery ticket printer. For this illustrated example embodiment, the configuration, and functions of the lottery ticket printer 180 does not need to change from the conventional configuration and functions of a lottery ticket printer, and is thus not described herein for brevity.

The lottery central system 200 can be any suitable lottery central system. For this illustrated example embodiment, the configuration, and functions of the lottery central system 180 does not need to change from the conventional configuration and functions of a lottery ticket printer, and is thus not described herein for brevity.

Turning now to FIG. 4, an example method 400 of operating the lottery selling system 100 is now described. Although the method is described with reference to the flowchart shown in FIG. 4, other methods of performing the acts associated with this illustrated process may be employed. For example, the order of certain of the illustrated blocks and diamonds may be changed, certain of the illustrated blocks and diamonds may be optional, or certain of the illustrated blocks and diamonds may not be employed.

In this example system and method for purchasing a draw lottery ticket for a draw lottery game remotely from a lottery terminal, a player uses the courier mobile application on the player electronic device 110 to select the play of the draw lottery game and the player numbers (or the quick pick numbers) for that play of the draw lottery game, as indicated by block 410. The courier mobile application on the player electronic device 110 creates lottery ticket purchase data (including the player selected play of the draw lottery game and the player numbers or the quick pick numbers) for that play of the draw lottery game and sends such lottery ticket purchase data to the courier server 130. In other words, the player's mobile electronic device sends the lottery ticket purchase data via the data network 120 (FIG. 1) to the courier server 130.

In this example, the courier server 130 uses the received lottery ticket purchase data to process the player wager, as indicated by block 414. This includes deducting the wager amount from the player funds in the player account maintained by the courier service for the player.

In this example, the courier server 130 uses the received lottery ticket purchase data to create a digital play slip image data, as indicated by block 416. This digital play slip image data represents an image of a filled out paper play slip that includes the player numbers (selected by the player or quick pick numbers) for the selected play of the selected draw lottery game. This image of a filled out paper play slip (if viewable) would appear to be in the same format as if it was a physical paper play slip.

This eliminates the need for the courier printer to physically print a paper play slip for the draw lottery game at a courier processing center. This also eliminates the need for a human courier processing clerk to take the physical printed play slip to an operator of a lottery terminal at a physical location of the lottery terminal (that may or may not be remote from the courier processing center). This also eliminates the need for a human courier processing clerk to take the physical printed play slip to a storage location to store the play slip.

In this example, the courier server 130 posts the wager to the players account with the courier service and sends a confirming message to the player, as indicated by block 418. The courier server 130 also transmits the digital play slip image data to the CIS reader emulator 150, as indicated by arrow 420.

In this example, the CIS reader emulator 150 and particularly the play slip service thereof receives the digital play slip image data from the courier server 130, as indicated by block 422.

In this example, the CIS reader emulator 150 places the digital play slip image data in a play slip que to be subsequently sent to and processed by a play slip reader when the play slip reader is enabled, as indicated by blocks 424 and 426. The play slip reader is enabled by the lottery terminal 150 when the lottery terminal 150 is ready to receive the next play slip, as indicated by blocks 428 and 430.

In this example, when the play slip reader is enabled, the CIS reader emulator 150 sends the digital play slip image data in the play slip que to the play slip reader and the play slip reader interprets the digital play slip image data to create play slip scan data (in the same format as would the CIS reader device driver 162 of the lottery terminal 160 would if the CIS reader device driver 162 would have scanned a physical paper play slip), as indicated by block 432. The CIS reader emulator 150 sends that play slip image data to the lottery terminal 160 (in the same format as a CIS reader would with a scanned image of a paper play slip), as indicated by line 433. This eliminates the need for an operator to use the CIS reader of the lottery terminal to scan the paper play slip (such as in the same manner as described above for the first example). More specifically, the CIS reader emulator 150 sends that play slip image data to the lottery terminal 160 such that the physical elements of the CIS reader of the lottery terminal 160 are or can be bypassed and the software components of the lottery terminal 160 can still process the play slip scan data.

In this example, the lottery terminal 160 processes the play slip image data, as indicated by block 434.

In this example, the lottery terminal 160 determines whether to accept or reject the play slip, as indicated by block 436. It is unlikely that the lottery terminal 160 would ever reject such a play slip, because the play slip image data is electronically created and thus unlikely to have any of the types of errors that can occur with paper play slips (such as, but not limited to, too few or too many player numbers selected).

In this example, responsive to the lottery terminal 160 determining to reject the play slip, the lottery terminal 150 determines to reject the player's wager and send an appropriate message back, as indicated by block 438. The lottery terminal 150 sends a play slip rejection response for the wager to the play slip response receiver of the CIS reader emulator 150, as indicated by block 440. The play slip response receiver of the CIS reader emulator 150 sends the rejected wager message back to the courier server 130, as indicated by block 442. The courier server 130 sends a message back to the player electronic device 110, as indicated by block 446R. The player electronic device 110 can then display a suitable rejection message to the player.

In this example, the responsive to the lottery terminal 160 determining to accept the play slip, the lottery terminal 150 creates and sends play slip wager data including the play slip scan data to the terminal application, as indicated by block 450 and line 451.

In this example, the lottery terminal 150 also sends a play slip acceptance response for the wager to the play slip response receiver of the CIS reader emulator 150, as indicated by blocks 450 and 440. The play slip response receiver of the CIS reader emulator 150 sends the accepted wager message back to the courier server 130, as indicated by block 442. The courier server 130 sends a message back to the player electronic device 110, as indicated by block 446R. The player electronic device 110 can then display a suitable acceptance message to the player.

In this example, the lottery terminal 150 processes the play slip wager data including the play slip scan data, as indicated by block 452.

In this example, the lottery terminal 150 determines whether to accept or reject the wager data, as indicated by block 454.

In this example, responsive to the lottery terminal determining to reject the wager data, the lottery terminal 160 creates and sends a play slip rejection response for the wager to the play slip response receiver of the CIS reader emulator 150, as indicated by blocks 438 and 440. The play slip response receiver of the CIS reader emulator 150 sends the rejected wager to the courier server 130, as indicated by block 442. The courier server 130 send a message back to the player electronic device 110, as indicated by block 446R. The player electronic device 110 can display a suitable rejection message to the player.

In this example, responsive to the lottery terminal determining to accept the wager data, the lottery terminal 160 determines whether to edit the play slip, as indicated by block 456.

In this example, responsive to the lottery terminal determining to edit the play slip, the lottery terminal 160 displays any errors on the lottery terminal display screen, as indicated by line 457 and again determines whether to accept the wager data, as indicated by block 454.

In this example, responsive to the lottery terminal 160 determining no need to edit the play slip, the lottery terminal 160 causes a lottery printer 180 to print the lottery ticket, as indicated by block 458. Thus, the lottery terminal 160 causes the lottery ticket printer 180 to print out the draw lottery ticket with the player numbers. The lottery terminal 160 also communicated with the host of the lottery system in a conventional manner.

The operator of the lottery terminal 160 also collects the payment for the draw lottery ticket from the courier service and provides the printed draw lottery ticket to a courier processing clerk. The courier processing clerk then takes the printed draw lottery ticket back to the courier processing center and scans the printed lottery ticket using a courier scanning system connected the courier server. The courier server links the scanned draw lottery ticket back to the player (or player account established through the courier mobile application). The courier server makes the scanned lottery ticket available for the player to view via the courier mobile application on the player's mobile electronic device. The courier processing clerk places the lottery ticket in a secure courier storage location for storage if needed by the player or the courier service at a later time (as discussed above).

As explained above, while the CIS reader emulator is used as an example herein, it should be appreciated that the present disclosure contemplates that other play slip reader emulators (besides CIS reader emulators) can be employed in accordance with the present disclosure.

It should further be appreciated from the above that various embodiments of the present disclosure provide a lottery ticket selling system including: (1) a courier server configured to: (a) receive lottery ticket purchase data from a player electronic device, the lottery ticket purchase data including indications of player numbers for a lottery ticket for a play of a draw lottery game, (b) create digital play slip image data in a first format and including indications of the player numbers for the lottery ticket for the play of the draw lottery game, and (c) transmit the digital play slip image data; and (2) a play slip reader emulator configured to: (a) receive the digital play slip image data from the courier server, (b) create play slip scan data using the digital play slip image data, wherein the play slip scan data is in a second format configured to be received by a lottery terminal, and wherein the play slip scan data includes indications of the player numbers for the lottery ticket for the play of the draw lottery game, and (c) transmit the play slip scan data to a lottery terminal.

In various such embodiments, the lottery terminal includes a play slip reader, and the play slip reader emulator is configured to transmit the play slip scan data to the lottery terminal in a manner that bypasses scanning hardware of the play slip reader of the lottery terminal.

In various such embodiments, the lottery terminal includes a play slip reader, and the play slip reader emulator is configured to transmit the play slip scan data to a terminal application of the lottery terminal in a manner that bypasses the play slip reader of the lottery terminal. In various such embodiments, the lottery terminal includes a play slip reader configured to transmit the play slip scan data in a third format to the lottery terminal, and wherein the second format is the same as the third format. In various such embodiments, the second format is different than the first format.

In various such embodiments, the lottery terminal includes a play slip reader configured to transmit the play slip scan data in a third format to a terminal application of the lottery terminal, and wherein the second format is the same as the third format. In various such embodiments, the second format is different than the first format. In various such embodiments, the second format is different than the first format.

In various such embodiments, the play slip reader emulator includes a play slip web server configured to receive the digital play slip image data from the courier server, a play slip que configured to hold the digital play slip image data, and a reader emulator configured to create the play slip scan data using the digital play slip image data.

It should further be appreciated from the above that various embodiments of the present disclosure provides lottery ticket selling system play slip reader emulator including: (1) a play slip web server configured to receive the digital play slip image data in a first format from a courier server, wherein the courier server is configured to: (a) receive lottery ticket purchase data from a player electronic device, the lottery ticket purchase data including indications of player numbers for a lottery ticket for a play of a draw lottery game, (b) create the digital play slip image data in a first format and including indications of the player numbers for the lottery ticket for the play of the draw lottery game, and (c) transmit the digital play slip image data to the play slip web server; (2) a play slip que configured to hold the digital play slip image data; (3) a reader emulator configured to create play slip scan data using the digital play slip image data, wherein the play slip scan data is in a second format configured to be received by a lottery terminal, and wherein the play slip scan data includes indications of the player numbers for the lottery ticket for the play of the draw lottery game; and (4) a transmitter configured to transmit the play slip scan data to a lottery terminal.

In various such embodiments, the lottery terminal includes a play slip reader, and the play slip reader emulator is configured to transmit the play slip scan data to the lottery terminal in a manner that bypasses scanning hardware of the play slip reader of the lottery terminal.

In various such embodiments, the lottery terminal includes a play slip reader, and the play slip reader emulator is configured to transmit the play slip scan data to a terminal application of the lottery terminal in a manner that bypasses the play slip reader of the lottery terminal.

In various such embodiments, the lottery terminal includes a play slip reader configured to transmit the play slip scan data in a third format to the lottery terminal, and wherein the second format is the same as the third format. In various such embodiments, the second format is different than the first format.

In various such embodiments, the lottery terminal includes a play slip reader configured to transmit the play slip scan data in a third format to a terminal application of the lottery terminal, and wherein the second format is the same as the third format. In various such embodiments, the second format is different than the first format. In various such embodiments, the second format is different than the first format.

It should further be appreciated from the above that various embodiments of the present disclosure provides a lottery ticket selling system play slip reader emulator including: (1) a play slip web server configured to receive the digital play slip image data in a first format from a courier server, wherein the courier server is configured to: (a) receive lottery ticket purchase data from a player electronic device, the lottery ticket purchase data including indications of player numbers for a lottery ticket for a play of a draw lottery game, (b) create the digital play slip image data in a first format and including indications of the player numbers for the lottery ticket for the play of the draw lottery game, and (c) transmit the digital play slip image data to the play slip web server; (2) a play slip que configured to hold the digital play slip image data; (3) a reader emulator configured to create play slip scan data using the digital play slip image data, wherein the play slip scan data is in a second format configured to be received by a play slip reader driver device of a lottery terminal, and wherein the play slip scan data comprises indications of the player numbers for the lottery ticket for the play of the draw lottery game; and (4) a transmitter configured to transmit the play slip scan data to the play slip reader driver device of the lottery terminal, wherein the lottery terminal includes play slip reader hardware configured to transmit the play slip scan data in a third format to the lottery terminal, and wherein the second format is the same as the third format, and wherein the second format is different than the first format.

In various such embodiments, the play slip reader emulator is configured to transmit the play slip scan data to the lottery terminal in a manner that bypasses the play slip reader hardware of the lottery terminal. In various such embodiments, the lottery ticket selling system play slip reader emulator enables the play slip reader hardware of the lottery terminal to be disconnected.

It should be appreciated from the above that these various example embodiments of the present disclosure provide a series of advantages that enable lottery tickets to be purchased. The advantages include but are not limited to the following advantages: (a) the courier service not having to physically print out the play slips; (b) the courier service not having to repeatedly handle the physically printed play slips; (c) the courier service not having to store the physically printed play slips; (d) the courier service not having to obtain and maintain the printers for printing the play slips; (e) the elimination of the use of paper and printing supplies for printing the play slips; and (f) the elimination of the eventual needed disposal of the stored paper play slips.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket selling system comprising:
 a courier server configured to:
  receive lottery ticket purchase data from a player electronic device, the lottery ticket purchase data comprising indications of player numbers for a lottery ticket for a play of a draw lottery game,
  create digital play slip image data in a first format and comprising indications of the player numbers for the lottery ticket for the play of the draw lottery game, and
  transmit the digital play slip image data; and
 a play slip reader emulator configured to:
  receive the digital play slip image data from the courier server,
  create play slip scan data using the digital play slip image data, wherein the play slip scan data is in a second format configured to be received by a lottery terminal, and
  wherein the play slip scan data comprises indications of the player numbers for the lottery ticket for the play of the draw lottery game, and
 transmit the play slip scan data to a lottery terminal.

2. The lottery ticket selling system of claim 1, wherein the lottery terminal comprises a play slip reader, and the play slip reader emulator is configured to transmit the play slip scan data to the lottery terminal in a manner that bypasses scanning hardware of the play slip reader of the lottery terminal.

3. The lottery ticket selling system of claim 1, wherein the lottery terminal comprises a play slip reader, and the play slip reader emulator is configured to transmit the play slip scan data to a terminal application of the lottery terminal in a manner that bypasses the play slip reader of the lottery terminal.

4. The lottery ticket selling system of claim 1, wherein the lottery terminal comprises a play slip reader configured to transmit the play slip scan data in a third format to the lottery terminal, and wherein the second format is the same as the third format.

5. The lottery ticket selling system of claim 4, wherein the second format is different than the first format.

6. The lottery ticket selling system of claim 1, wherein the lottery terminal comprises a play slip reader configured to transmit the play slip scan data in a third format to a terminal application of the lottery terminal, and wherein the second format is the same as the third format.

7. The lottery ticket selling system of claim 6, wherein the second format is different than the first format.

8. The lottery ticket selling system of claim 1, wherein the second format is different than the first format.

9. The lottery ticket selling system of claim 1, wherein the play slip reader emulator comprises a play slip web server configured to receive the digital play slip image data from the courier server, a play slip que configured to hold the digital play slip image data, and a reader emulator configured to create the play slip scan data using the digital play slip image data.

10. A lottery ticket selling system play slip reader emulator comprising:
 a play slip web server configured to receive the digital play slip image data in a first format from a courier server, wherein the courier server is configured to:
  receive lottery ticket purchase data from a player electronic device, the lottery ticket purchase data comprising indications of player numbers for a lottery ticket for a play of a draw lottery game,
  create the digital play slip image data in a first format and comprising indications of the player numbers for the lottery ticket for the play of the draw lottery game, and
  transmit the digital play slip image data to the play slip web server;
 a play slip que configured to hold the digital play slip image data;
 a reader emulator configured to create play slip scan data using the digital play slip image data, wherein the play slip scan data is in a second format configured to be received by a lottery terminal, and wherein the play slip scan data comprises indications of the player numbers for the lottery ticket for the play of the draw lottery game; and
 a transmitter configured to transmit the play slip scan data to a lottery terminal.

11. The lottery ticket selling system play slip reader emulator of claim 10, wherein the lottery terminal comprises a play slip reader, and the play slip reader emulator is configured to transmit the play slip scan data to the lottery terminal in a manner that bypasses scanning hardware of the play slip reader of the lottery terminal.

12. The lottery ticket selling system play slip reader emulator of claim 10, wherein the lottery terminal comprises a play slip reader, and the play slip reader emulator is configured to transmit the play slip scan data to a terminal application of the lottery terminal in a manner that bypasses the play slip reader of the lottery terminal.

13. The lottery ticket selling system play slip reader emulator of claim 10, wherein the lottery terminal comprises a play slip reader configured to transmit the play slip scan data in a third format to the lottery terminal, and wherein the second format is the same as the third format.

14. The lottery ticket selling system play slip reader emulator of claim 13, wherein the second format is different than the first format.

15. The lottery ticket selling system play slip reader emulator of claim 10, wherein the lottery terminal comprises a play slip reader configured to transmit the play slip scan data in a third format to a terminal application of the lottery terminal, and wherein the second format is the same as the third format.

16. The lottery ticket selling system play slip reader emulator of claim 15, wherein the second format is different than the first format.

17. The lottery ticket selling system play slip reader emulator of claim 10, wherein the second format is different than the first format.

18. A lottery ticket selling system play slip reader emulator comprising:
 a play slip web server configured to receive the digital play slip image data in a first format from a courier server, wherein the courier server is configured to:
  receive lottery ticket purchase data from a player electronic device, the lottery ticket purchase data comprising indications of player numbers for a lottery ticket for a play of a draw lottery game,
  create the digital play slip image data in a first format and comprising indications of the player numbers for the lottery ticket for the play of the draw lottery game, and transmit the digital play slip image data to the play slip web server;

a play slip que configured to hold the digital play slip image data;

a reader emulator configured to create play slip scan data using the digital play slip image data, wherein the play slip scan data is in a second format configured to be received by a play slip reader driver device of a lottery terminal, and wherein the play slip scan data comprises indications of the player numbers for the lottery ticket for the play of the draw lottery game; and a transmitter configured to transmit the play slip scan data to the play slip reader driver device of the lottery terminal, wherein the lottery terminal comprises play slip reader hardware configured to transmit the play slip scan data in a third format to the lottery terminal, and wherein the second format is the same as the third format, and wherein the second format is different than the first format.

19. The lottery ticket selling system play slip reader emulator of claim 18, wherein the play slip reader emulator is configured to transmit the play slip scan data to the lottery terminal in a manner that bypasses the play slip reader hardware of the lottery terminal.

20. The lottery ticket selling system play slip reader emulator of claim 18, which enables the play slip reader hardware of the lottery terminal to be disconnected.

* * * * *